July 27, 1948.  H. E. MURDOCK  2,445,859

SUPPORTING RACK FOR MILK STRAINERS

Filed Nov. 1, 1944

Inventor
Harold E. Murdock

By McMorrow & Berman

Attorneys

Patented July 27, 1948

2,445,859

UNITED STATES PATENT OFFICE 2,445,859

SUPPORTING RACK FOR MILK STRAINERS

Harold E. Murdock, Oneida, Ill.

Application November 1, 1944, Serial No. 561,454

2 Claims. (Cl. 248—94)

The present invention relates to new and useful improvements in racks adapted for supporting a milk strainer over the supply bowl of a cream separator, and the invention has for its primary object to provide a rack of this character embodying a ring member adapted for receiving a spout of the strainer and also including means engaging the edge of the bowl of the cream separator to retain the rack in position thereon.

A still further object is to provide a device of this character of simple and practical construction, which is economical to manufacture, efficient and reliable in use and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout, and in which—

Figure 1:
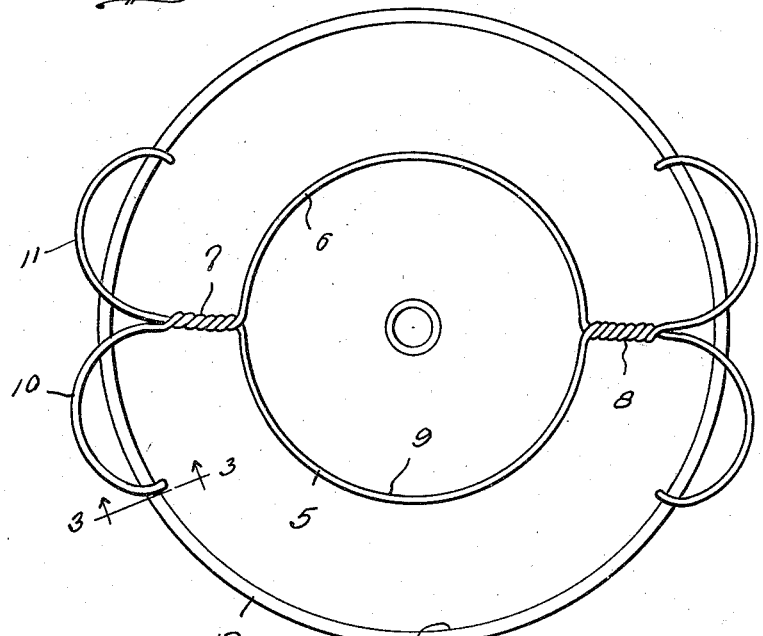
Figure 1 is a top plan view.
Figure 2:
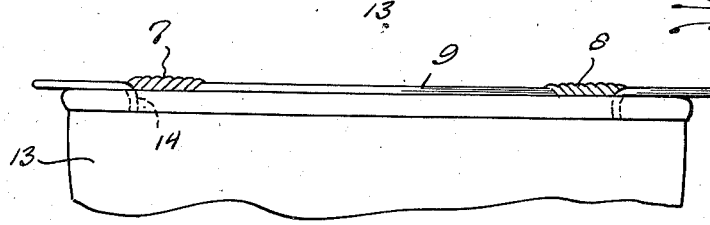
Figure 2 is a side elevational view.
Figure 3:
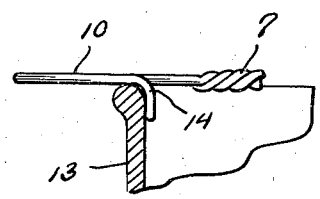
Figure 3 is a fragmentary sectional view taken substantially on a line 3—3 of Figure 1.

Referring now to the drawings in detail wherein for the purpose of illustration I have disclosed a preferred embodiment of the invention, the numerals 5 and 6 designate a pair of wire rods twisted together at longitudinally spaced points as shown at 7 and 8 to connect the rods together, the portion of each rod between the twisted portions being bent oppositely to form a ring 9 adapted for receiving the spout of a conventional form of milk strainer (not shown).

The adjacent ends of each of the rods 5 and 6 are bent oppositely as shown at 10 and 11 in substantially semi-circular form, each end of the rods being adapted to rest upon the rim 12 of a cream separator bowl 13 at a point adjacent the twisted portions of the rods as well as at a point adjacent the end of each rod as will be apparent from an inspection of Figure 1 of the drawings.

The ends of the rods are bent downwardly as shown at 14 and adapted to engage the inner edge of the bowl, whereby to prevent sliding movement of the rack on the bowl.

By supporting each end of the rods at longitudinally spaced points of the rods the supporting strength of the rack is increased and accordingly the rack may be constructed of substantially light weight or light gage wire rod and at the same time provide an adequate support for the milk strainer.

It is believed that the details of construction, manner of use and advantages of the device will be readily understood from the foregoing without further detailed explanation.

Having thus described the invention, what I claim is:

1. A strainer supporting rack for a cream separator bowl, comprising an inner ring consisting of two opposed curved wire sections, the ends of the wire sections being twisted together at diametrically opposite points with respect to the ring to form only two radial arms, the wire sections being extended at the outer ends of each radial arm to form a pair of large curved portions which are horizontal and disposed in the same plane, the curved portions in each pair extending circumferentially of the bowl in opposite directions and projecting radially inwardly and outwardly beyond the top edge of the bowl, the curved portions in each pair having their free ends bent downwardly to provide depending extensions to engage within the bowl.

2. A strainer supporting rack for a cream separator bowl, comprising an inner ring including two opposed curved wire sections, the ends of the wire sections being twisted together at diametrically opposite points with respect to the ring to form only two radial arms, the wire sections being extended at the outer ends of each arm to form a pair of large curved portions which are horizontal and disposed in the same plane, the curved portions in each pair extending circumferentially of the bowl in opposite directions and projecting radially inwardly and outwardly beyond the top edge of the bowl and having their free ends arranged in substantial alignment with the opposite side portions of the ring, the free ends of each pair of curved portions being bent downwardly to provide extensions engaging within the bowl.

HAROLD E. MURDOCK.

REFERENCES CITED

The following references are of record in the file of this patent:

UNITED STATES PATENTS

| Number | Name | Date |
|---|---|---|
| 1,191,994 | Pierson | July 25, 1916 |
| 1,264,917 | Green | May 7, 1918 |
| 1,950,378 | Andrews | Mar. 13, 1934 |